# 3,448,299
INVERTER

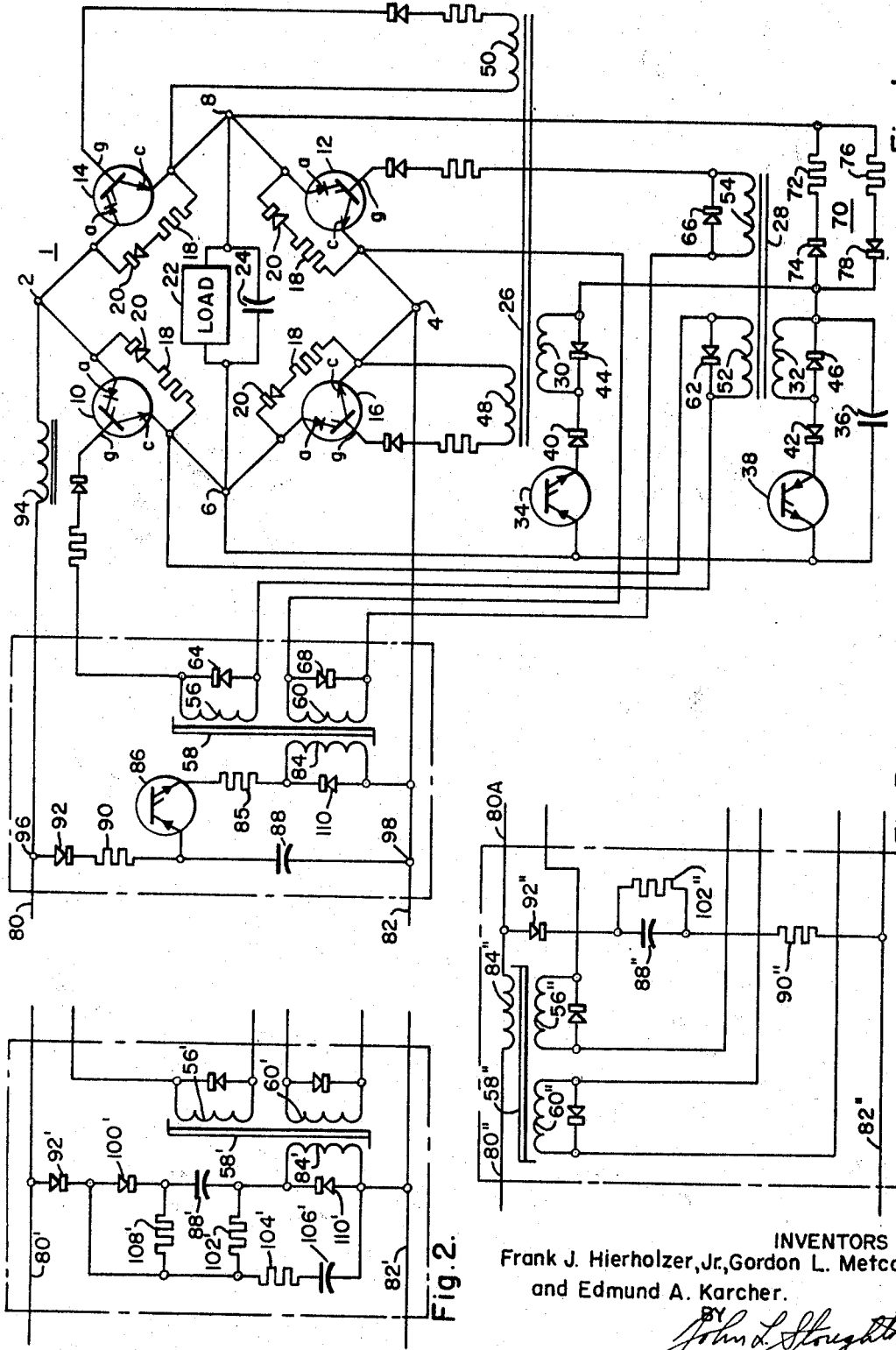
June 3, 1969    F. J. HIERHOLZER, JR., ET AL    3,448,299
INVERTER
Filed Oct. 18, 1962
INVENTORS
Frank J. Hierholzer, Jr., Gordon L. Metcalf
and Edmund A. Karcher.
BY John L. Stoughton
ATTORNEY

Frank J. Hierholzer, Jr., Westport, Conn., Gordon L. Metcalf, La Puente, Calif., and Edmund A. Karcher, Fort Monmouth, N.J., assignors to Westinghouse Electric Corporation, Pittsburgh, Pa., a corporation of Pennsylvania
Filed Oct. 18, 1962, Ser. No. 234,572
Int. Cl. H03k 3/26, 15/18, 23/08
U.S. Cl. 307—305                    19 Claims

ABSTRACT OF THE DISCLOSURE

A solid state network for inverting unidirectional potential electrical energy into alternating potential energy in which a saturating core transformer is energized and becomes saturated upon the initial connection of the network to the unidirectional potential and thereby initiate oscillation of the inverting network which thereafter oscillates independently of the transformer and which transformer remains saturated as long as the network remains connected to the source.

---

This invention relates generally to inverters for inverting a direct source of electrical energy into alternating current electrical energy and, more particularly, to means for starting the inverting device subsequent to energization thereof from the direct current voltage source.

An object of this invention is to provide a new means for starting the oscillating operation of an electrical energy inverter.

Another object of this invention is to provide an inverter starting means which is effective solely during the initial operation of the inverter.

A still further object is to provide such an inverter starting system which utilizes a saturable core transformer which provides a starting signal solely during the starting period of the inverter during which it becomes saturated.

Other objects of the invention will be apparent from the description, the appended claims and the drawings in which drawings:

FIGURE 1 is a schematic view of an inverter having a starting system embodying the invention;

FIG. 2 is a schematic diagram of a modified form of inverter starting system; and FIG. 3 is a schematic diagram of a still further modified form of starting system.

Referring to the drawings by characters of reference, the numeral 1 designates generally an inverter having a pair of direct current input terminals 2 and 4 and a pair of alternating current output terminals 6 and 8 which are interconnected by means of a first current path comprising silicon controlled rectifiers 10 and 12 and a second path comprising the rectifiers 14 and 16. Each of the silicon controlled rectifiers is provided with an anode $a$, a cathode $c$ and a gate $g$, the circuit between the anode $a$ and the cathode $c$ comprising a main circuit and the circuit between the cathode $c$ and the gate $g$ comprising a control circuit.

The anodes $a$ of the rectifiers 10 and 14 are each connected to the input terminal 2 and the cathodes $c$ thereof are connected respectively to the alternating current output terminals 6 and 8. The cathodes $c$ of the rectifiers 12 and 16 are connected to the direct current input terminal 4 and the anodes $a$ thereof are respectively connected to the alternating output terminals 8 and 6. In order to control the build-up of reverse voltage across the rectifiers 10, 12, 14 and 16, each thereof is shunted by means of a resistor 18 and a diode 20 series connected with each other and connected in shunt across the anode $a$ and cathode $c$ of the controlled rectifiers. The direction of conduction of each of the diodes 20 is in the opposite direction to the forward conduction of the main current path of the controlled rectifier with which it is associated. A load device 22 and a commutating capacitor 24 are each connected between the alternating current output terminals 6 and 8.

Conduction of the rectifiers 10, 12, 14 and 16 is initiated by means of first and second transfromers 26 and 28 having primary windings 30 and 32 respectively. The winding 30 of the transformer 26, a breakover device 34 and a rectifier 40 are series connected together and shunt connected with a chargeable device 36 such as a capacitor. The breakover device 34 is preferably of the semiconductor type known as a dynistor and more particularly a P-N-P-N switch. Similarly, the winding 32, a second breakover device 38 and a rectifier 42 are series connected together and connected in shunt with the chargeable device 36. The rectifiers 40 and 42 prevent reverse current flow through the breakdover devices 34 and 38. Rectifiers 44 and 46 are connected across the windings 30 and 32 respectively and are polarized to pass current generated by any voltage which may appear across the windings 30 and 32 in a polarity reverse to that caused by conduction of the breakdover devices 34 and 38.

The transformers 26 and 28 are provided with secondary windings 48 and 50 and secondary windings 52 and 54 respectively. The winding 52 is connected in series with a secodary winding 56 of a saturating core transformer 58 and between the gate $g$ and cathode $c$ of the controlled rectifier 10. Similarly, the secondary winding 54 is connected in series with a secondary winding 60 and between the gate $g$ and cathode $c$ of the controlled rectifier 12. Rectifiers 62 and 64 are connected in shunt with the windings 52 and 56 and each is poled to pass current in a direction toward the gate $g$ of the rectifier 10. Similarly, rectifiers 66 and 68 are connected in shunt with the windings 54 and 68 and each is poled to permit current flow toward the gate $g$ of the controlled rectifier 12. Resistors and diodes may be connected in the gate circuits to limit the forward gate current and prevent reverse gate current.

The capacitor 36 is series connected with a network 70 across the alternating current output terminals 6 and 8 of the inverter 1. The network 70 comprises a first resistor 72 series connected with a rectifier 74 parallelly connected with a second resistor 76 series connected with a second rectifier 78. The rectifiers 74 and 78 are oppositely poled so that during one-half cycle of the output potential between the terminals 6 and 8 current will flow through the resistor 72 and rectifier 74 to charge the capacitor 36 in one polarity and during the opposite half-cycle of the potential between the terminals 6 and 8 current will flow through the resistor 76 and rectifier 78 to charge the capacitor 36 in the opposite potential. When the capacitor 36 becomes charged to a predetermined voltage magnitude one of the breakover devices 34 or 38 will break over and the capacitor 36 will discharge through one of the primary windings 30 or 32. The magnitude of the resistors 72 and 76 independently control the two half-periods of the output voltage.

The breakover devices 34 and 38 are connected in opposite polarity so that one thereof breaks over upon charging of the capacitor 36 in a first polarity and the other thereof breaks over upon charging of the capacitor 36 to the opposite polarity. When the winding 30 or 32 is energized the controlled rectifiers 14 and 16 or 10 and 12 as the case may be will become energized to conduct current whereby the load 22 will be energized in one or the other polarity depending upon which of the sets of rectifiers 10 and 12 or 14 and 16 is rendered conducting. The commutating capacitor 24 acts upon the rendering of non-conducting set of rectifiers 10 and 12 or 14 and 16 conducting to cause the conducting set of rectifiers 14 and 16 or 10 and 12 to become non-conductive.

The inverter 1 so far described is, with the exception of the windings 56 and 60, disclosed and claimed in a copending application of Frank J. Hierholzer and Paul F. Pittman, Ser. No. 3,304, filed Jan. 19, 1960, now U.S. Patent 3,059,191 dated Oct. 16, 1962, and assigned to the same assignee as is this application. This invention is directed to the combination of the inverter and an improved starting system or network for initiating oscillation of the inverter as a consequence of the energization of a pair of conductors 80 and 82 which connect the input terminals 2 and 4 to the positive and negative terminals, respectively, of a source of unidirectional potential, not shown. Novelty is also believed to lie in the starting network per se as well as in its combination with the inverter.

The saturable core transformer 58 has its primary winding 84 shunt connected across a chargeable device 88 such as a capacitor through a breakover device 86 similar to the devices 34 and 38. The capacitor 88 is energized from the conductors 80 and 82; one terminal being connected to the conductor 82 and the other terminal connected to the conductor 80 through a resistor 90 and a rectifier 92. Preferably, a current smoothing reactor 94 is provided in the conductor 80 intermediate the input terminal 2 and the starting network terminal 96 to which the rectifier 92 is connected.

Prior to energization of the conductors 80 and 82, none of the controlled rectifiers will be conducting and the output terminals 6 and 8 will for all practical purposes be deenergized. Under these conditions no energy will be supplied to the capacitor 36 and an external source of energy is required to initiate oscillation of the inverter 1. This required initial pulse of energy is derived from the transformer 58 as a consequence of the charging of the capacitor 88 to the breakover voltage of the breakover device 86. Upon initial energization of the conductors 80 and 82, current flows from the terminal 96 through rectifier 92, resistor 90 and capacitor 88 to terminal 98 at a controlled rate depending upon the magnitude of the impedance of the resistor 90. When the potential across the capacitor 88 reaches the breakdown voltage of the breakdown device 86, it breaks down and conducts to supply a current pulse to the primary winding 84 of the transformer 56. This pulse energizes the secondary windings 56 and 60 thereof to supply sufficient current at the proper polarity to render the controlled rectifiers 10 and 12 conducting. This pulse is of a finite duration depending upon the saturating characteristics of the core of the transformer 58, which when saturated terminates further energization of the windings 56 and 60. The magnitude of the capacitance of the capacitor 88 should be sufficient to provide a voltage of the wavefront and duration as required by the controlled rectifiers 10 and 12 to cause proper conduction through their main paths. The resistor 85 intermediate the device 86 and winding 84 controls the peak value of current through the winding 84 and the time period required to saturate the associated core.

When the controlled rectifiers 10 and 12 become conductive, a circuit is completed from the conductor 80 through the reactor 94, the terminal 2, the controlled rectifier 10, terminal 6, load 22, terminal 8, controlled rectifier 12, and terminal 4 back to the line 82. Concurrently with the energization of the load 22, current will flow from terminal 6 through capacitor 36, rectifier 74 and resistor 72 to the terminal 8 whereby the capacitor 36 charges at a predetermined rate. When the charge in the capacitor 36 reaches a predetermined magnitude, the breakover device 34 breaks over discharging the capacitor 36 through the primary winding 30 of the transformer 26. The discharging of the capacitor 36 through the winding 30 energizes the secondary windings 48 and 50 which apply a starting pulse between the gates $g$ and cathodes $c$ of the controlled rectifiers 14 and 16 to render these controlled rectifiers conducting. Rendering of the rectifiers 14 and 16 conducting, causes the commutating capacitor 24 to render the previously conducting rectifiers 10 and 12 non-conducting. With rectifiers 14 and 16 conducting and rectifiers 10 and 12 non-conducting, the source potential is applied to the output terminals 6 and 8 through the second path and the output terminals 6 and 8 are energized at a polarity opposite to that described above when the first path was conducting.

Subsequently, the capacitor 36 reaches a critical potential and the breakover device 38 again breaks over whereby the capacitor 36 discharges through the primary winding 32 to energize the windings 52 and 54. These windings 52 and 54 apply a starting pulse between the gates $g$ and cathodes $c$ of the controlled rectifiers 10 and 12, of the first rectifier path, and these rectifiers conduct. Conduction of the controlled rectifiers 10 and 12 cause the commutating capacitor 24 to render the previously conducting controlled rectifiers 14 and 16 non-conducting and the terminals 6 and 8 are again connected to the voltage source but in the original polarity.

The inverter 1 will continue to alternate the conduction of its paths under the control of the charging and discharging of the capacitor 36 to thereby supply an alternating potential to the load 22. It should be appreciated that the initial or starting impulse produced as a consequence of the saturation of the core of the transformer 58 starts the oscillation of the network 1 and that as long as the conductors 80 and 82 remain energized the network 1 will continue to oscillate as above described under control of the capacitor 36. As long as the conductors 80 and 82 remain energized, the transformer 58 will remain saturated and the starting network will remain ineffective. However, it will be equally apparent that upon deenergization of the conductors 80 and 82, the oscillations of the network 1 will terminate and the transformer 58 will come out of saturation so that a subsequent reenergization of the conductors 80 and 82 will again reenergize transformer 58 to initiate oscillations of the inverter 1. A rectifier 110 is shunt connected across the winding 84 to bypass reverse surges and to assist in the desaturating of the core of transformer 58.

In the form of the invention shown in FIG. 2, the secondary windings 56' and 60' of the saturating core transformer 58' are connected exactly as are the secondary windings 56 and 60 of the transformer 58. The primary winding 84' of the transformer 58', is connected in series with a capacitor 88' and a pair of rectifiers 100' and 92' between supply conductors 80' and 82'. The purpose of the transformer 58' is exactly the same as that of the transformer 58 and upon initial energization of the conductors 80' and 82' the primary winding 84' will be energized to saturate the core thereof. This pulsatingly energizes the secondary windings 56' and 60' to render controlled rectifiers 10 and 12 conducting. Subsequent to saturation of the core of the transformer 58' further energization of the windings 56' and 60' will cease, and the inverter 1 will continue to oscillate as described above.

It will be noted that the primary winding 84' is series connected with capacitor 88'. This provides a steep wave front in voltage output from the windings 56' and 60' which facilitates the rapid rendering of the controlled rectifiers 10 and 12 into their conducting condition. Subsequent to charging of the capacitor 88' the core of the transformer 58' will remain saturated by the current flowing through a resistor 102' which shunts the rectifier 100' and the capacitor 88'.

In order to prevent the transformer 58' from coming out of saturation due to a momentary variation in potential between the conductors 80' and 82', the capacitor 106' is connected in series with the resistor 104' and the rectifier 92' between the conductors 80' and 82' whereby it is normally maintained in a predetermined charged condition during oscillation of the inverter 1. A capacitor 106' is connected to the winding 84' through resistors 102' and 104' as illustrated. A ressitor 108' is shunt connected with a rectifier 100' to provide a discharge circuit for the capacitor 88' which, upon deenergization of the conductors 80' and 82', permits the current to flow from the upper terminal of the capacitor 88' through the resistor 108', the resistor 102' back to the lower plate of the capacitor 88'. Rectifier 110' is shunt connected across the primary winding 84' to bypass any current surges in the reverse direction.

In FIGURE 3, a saturable transformer 58" has its secondary windings 56" and 60" connected in the gate-cathode circuits of the controlled rectifiers 10 and 12 of the inverter 1. The primary winding 84" of the transformer 58" is connected in series in the bus 80" intermediate the source of supply and the smoothing reactor 94. In order to provide for energization of the winding 84" prior to conduction of any of the controlled rectifiers 10, 12, 14 or 16, a rectifier 92''', a capacitor 88" and a resistor 90" are series connected between a portion 80A of the bus 80" and the other bus 82". The portion 80A of the bus 80" is located between the winding 84" and the smoothing reactor 94. The charging current of the capacitor 88" upon initial energization of the conductors 80" and 82" is of sufficient magnitude to energize the primary winding 84" so that a conducting pulse will be supplied by the windings 56" and 60" to render the controlled rectifiers 19 and 12 conducting. Subsequent to conduction of the rectifiers 10 and 12 the network 1 will commence to oscillate as described above. The current flowing to the inverter is sufficient to maintain the core of the transformer 58" saturated and no further output signals will be supplied by the transformer 58" to the control circuit of the controlled rectifiers 10 and 12. A discharge resistor 102" is shunt connected around the capacitor 88" to permit discharge of the capacitor 88" upon deenergization of the conductors 80" and 82".

While only a limited number of embodiments of the invention are disclosed, it is to be understood that numerous modifications are possible and it is desired to cover all modifications falling within the spirit and scope of the invention.

What is claimed and is desired to be secured by U.S. Letters Patent is as follows:

1. A start-operate network for electric valves comprising, a pair of input terminals, first and second electric valves, each said valve having a pair of main terminals and a control terminal, a saturable core transformer having a primary winding and a secondary winding, a chargeable device, current conducting means connecting said device between said input terminals for the charging of said device with energy directly from said input terminals irrespective of the conductive condition of said valves, a breakover device, means connecting said primary winding in shunt circuit with said chargeable device and including said breakover device, said last-named means further connecting said primary winding between said input terminals whereby the core of said saturable core transformer will remain saturated after breakover of said breakover device, first circuit means connected between said control treminal and one of said main terminals of said first valve and including said secondary winding, and second circuit means connected to said input terminals through said main terminals of said valves and energizable in a first polarity upon conduction between said main terminals of said first valve and in a second polarity upon conduction between said main terminals of said second valve, said second circuit means being connected between said control terminal and one of said main terminals of said second valve in a first polarity and between said control terminal and said one electrode of said first valve in a second polarity for alternately causing said valves to conduct current between said main electrodes.

2. A control circuit for an electric valve having a pair of control terminals, a pair of input terminals, a saturating core transformer having a primary winding and a secondary winding, a control circuit connected between said control terminals and including said secondary winding, a breakover device, a chargeable device, a current controlling device, means connecting said chargeable device and said current controlling device in series between said input terminals, and means connecting said primary winding in shunt circuit with said chargeable device and including said breakover device the magnitude of the current controlling device being related to the current required to maintain conduction through said breakover device such that as long as said input terminals remain energized said breakover device when once having been rendered conducting will remain conducting whereby the core of said transformer will remain saturated.

3. A control circuit for an electric valve having a pair of control terminals, a pair of input terminals, a saturating core transformer having a primary winding and a secondary winding, a control circuit connected between said control terminals and including said second winding, a chargeable device, a current controlling device, means connecting said chargeable device and said current controlling device in series between said terminals, and a network having a first portion connecting said primary winding in series circuit with said chargeable device between said pair of input terminals whereby the core of said transformer is saturated as a consequence of the charging of said chargeable device when said input terminals are energized, said network having a second portion conducting current derived from said input terminals for maintaining said core saturated subsequent to the charging of said chargeable device.

4. A control circuit for an electric valve having a pair of control terminals, a pair of input terminals, a saturating core transformer having a primary winding and a secondary winding, a control circuit connected between said control terminals and including said secondary winding, a chargeable device, means connecting said chargeable device and said primary winding in series between said input terminals, the magnitude of current required to charge said chargeable device being not less than the magnitude of the current required to saturate the core of said transformer, an asymmetric current conducting device having a lesser impedance to current flow in a first direction therethrough then in a second direction, said asymmetric device being connected in series with said chargeable device, a core-saturation-maintaining circuit connecting said primary winding between said input terminals and effective to maintain said core saturated subsequent to the charging of said chargeable device, and a discharge circuit for said chargeable device.

5. A control circuit for an electric valve having a pair of control terminals, a pair of input terminals, a transformer having a primary winding and a secondary winding, a control circuit connected between said control terminals and including said secondary winding, a chargeable device, a current controlling device, means connecting said chargeable device and said current controlling device and said primary winding in series between said input terminals, an asymmetric current conducting device having a lesser impedance to current flow in a first direction therethrough than in a second direction, said asymmetric device being connected in series with said chargeable device, a discharge circuit for said chargeable device, a second chargeable device, and means connecting said second chargeable device for discharging through said primary winding.

6. A control circuit for an electric valve having a pair of control terminals, a pair of input terminals, a saturating core transformer having a primary winding and a secondary winding, a control circuit connected between said control terminals and including said secondary winding, first and second asymmetric current conducting devices, a first capacitor, means connecting said first and said second asymmetric devices and said capacitor and said primary winding in series circuit in the order set forth between said input terminals, a second capacitor, a plurality of impedance devices, means connecting said second capacitor and a first of said impedance devices in series and in shunt with said second asymmetric device and said first capacitor and said primary winding, means connecting a second of said impedance devices in shunt with said second asymmetric device and said first capacitor, and means connecting a third of said impedance devices in shunt with said second asymmetric device.

7. A control circuit for an electric valve having a pair of control terminals, a pair of input terminals, a saturating core transformer having a primary winding and a secondary winding, a control circuit connected between said control terminals and including said secondary winding, a breakover device, first and second asymmetric devices, a capacitor, first and second impedance devices, means connecting said first asymmetric device and said first impedance device, and said breakover device and said second impedance device and said primary winding in series in the order named between said input terminals, means connecting said second asymmetric device in shunt with said primary winding, and means connecting said capacitor in shunt with said breakover device and said second impedance device and said primary winding, the magnitude of the total impedance of said impedances of said impedance devices being related to the current required to maintain conduction through said breakover device such that as long as said input terminals remain energized said breakover device once having been rendered conducting will remain conducting whereby the core of said transformer will remain saturated, the magnitude of the impedance of said second impedance device being related to the capacity of said capacitor and to the breakover voltage of said breakover device such that current flows at a controlled rate to control the time required to saturate the core of said saturating core transformer thereby to control the duration of energization of said control terminals by said control circuit.

8. A control circuit for an electric valve having a pair of control terminals, a pair of input terminals, a saturating core transformer having a primary winding and a secondary winding, a control circuit connecting said secondary winding to said control terminals, a breakover device, first asymmetric device, a capacitor, first impedance device, means connecting said first asymmetric device and said first impedance device, and said breakover device and said primary winding in series in the order named between said input terminals, and means connecting said capacitor in shunt with said breakover device and said primary winding, the magnitude of the impedance of said impedance device being related to the current required to maintain conduction through said breakover device such that as long as said input terminals remain energized said breakover device when once having been rendered conducting will remain conducting whereby the core of said transformer will remain saturated.

9. A control circuit for an electric valve having a pair of control terminals, a pair of input terminals, a saturating core transformer having a primary winding and a secondary winding, a control circuit connected between said control terminals and including said secondary winding, a breakover device, a capacitor, first impedance device, means connecting said first impedance device and said breakover device and said primary winding in series in the order named between said input terminals, and means connecting said capacitor in shunt with said breakover device and said primary winding, the magnitude of the impedance of said impedance device being related to the current required to maintain conduction through said breakover device such that as long as said input terminals remain energized said breakover device when once having been rendered conducting will remain conducting whereby the core of said transformer will remain saturated.

10. A control circuit for an electric valve having a pair of control terminals, a pair of input terminals, a saturating core transformer having a primary winding and a seconday winding, a control circuit connected between said control terminals and including said secondary winding, a chargeable device, an asymmetric device, an impedance device, means connecting said primary winding and said devices in series betwen said input terminals, the magnitude of current required to charge said chargeable device being not less than the magnitude of current required to saturate the core of said transformer, a core-saturation-maintaining circuit connecting said primary winding between said input terminals and effective to maintain said core saturated subsequent to the charging of said chargeable device, and a discharging device connected to discharge said chargeable device.

11. A control circuit for an electric valve having a pair of control terminals, a pair of input terminals, a saturating core transformer having a primary winding and a secondary winding, a control circuit connected between said control terminals and including said secondary winding, a capacitor, a resistor, an asymmetric device, means connecting said primary winding and said capacitor and said asymmetric device and said resistor in series circuit between said input terminals, the magnitude of current required to charge said capacitor being not less than the magnitude of the current required to saturate the core of said transformer, a core-saturation-maintaining circuit connecting said primary winding between said input terminals and effective to maintain said core saturated subsequent to the charging of said chargeable device, and a second resistor connected in shunt with said capacitor.

12. A start-operate network for a valve device comprising, a pair of input terminals, a source of direct potential connected across said terminals, first and second semiconductor valves, each said valve having a control circuit, first and second energizable circuits individually connected to energize said control circuits of said first and said second valves respectively, a saturating core transformer having a primary winding and a secondary winding, said first circuit including means connecting said secondary winding across said control circuit of said first valve for energization thereof by the potential generated in said transformer, and circuit means connecting said primary winding to said input terminals for energization thereof by direct potential energy from said input terminals, said last-named means being effective to saturate said core and thereafter maintain said core saturated for as long as said input terminals are maintained energized.

13. A start-operate network for valves comprising, a first pair of terminals, means to energize said first pair of terminals with direct potential a second pair of terminals, first and second valves, each said valve having a control circuit, a first transformer having a primary winding and a pair of secondary windings, a saturating core transformer having a first and a second winding, means connecting said primary winding across said second pair of terminals, a first energizable circuit connecting said control circuit of one of said valves to one of said pair of secondary windings and to said second winding for energization thereof by the electrical quantity generated in one of said secondary windings and said second winding, a second circuit connecting said control circuit of the other of said valves to the other of said pair of secondary windings, and circuitry connecting said first winding for energization of said first winding by direct potential energy from said first pair of terminals, said last-named circuitry being effective upon energization of said first pair of terminals to saturate the core of said saturating core transformer and thereafter maintain said core of said saturating transformer saturated for as long as said first pair of terminals are maintained energized.

14. The combination of claim 13 in which each said valve has a main circuit and there is provided means interconnecting said pairs of terminals, said means including at least one of said main circuits.

15. The combination of claim 13 in which there is provided a source of alternating potential electrical energy, a source of unidirectional potential electrical energy, circuit means connecting said alternating energy source to said second pair of terminals, and means connecting said unidirectional energy source to said first pair of terminals.

16. The combination of claim 15 in which energy transfer means is provided to supply energy from said unidirectional source to said alternating source, said valve includes a main circuit, and said transfer means includes said main circuit of said valve.

17. The combination of claim 13 in which said valve includes a main circuit, and there is provided a circuit means connecting said second pair of terminals to said first pair of terminals through said main circuit of said valve, and a source of unidirectional potential electrical energy connected to energize said first pair of terminals.

18. The combination of claim 17 in which said circuitry which connects said first winding to said first pair of terminals includes a first energy storage device, and means connecting said device with said first winding such that a change in the quantity of energy stored in said device in one direction causes current to pass through said first winding.

19. The combination of claim 18 in which said circuitry which connects said first winding to said first pair of terminals includes a second energy storage device, and means connecting said second storage device to said first winding to supply energy thereto upon a decrease in the potential supplied to said first pair of terminals.

References Cited

UNITED STATES PATENTS

| | | | |
|---|---|---|---|
| 3,188,813 | 6/1965 | Frierdich | 321—45 |
| 3,118,105 | 1/1964 | Relation | 321—45 |
| 3,146,392 | 8/1964 | Sylvan | 307—88.5 |
| 3,019,355 | 1/1962 | Morgan | 307—88.5 |
| 2,752,556 | 6/1956 | Webb et al. | 323—89.11 |
| 3,206,694 | 9/1965 | Bates | 331—165 |

ARTHUR GAUSS, *Primary Examiner.*

B. P. DAVIS, *Assistant Examiner.*

U.S. Cl. X.R.

307—252, 314; 321—45; 323—51